Feb. 25, 1969

E. S. McKEE 3,429,518

DEVICE FOR STRIPPING AND FEEDING STRIP MATERIAL FROM A ROLL

Original Filed July 8, 1965

EDWARD S. McKEE
INVENTOR.

BY R. Frank Smith
David P. Ogden

ATTORNEYS

United States Patent Office 3,429,518
Patented Feb. 25, 1969

3,429,518
DEVICE FOR STRIPPING AND FEEDING STRIP
MATERIAL FROM A ROLL
Edward S. McKee, Rochester, N.Y., assignor to Eastman
Kodak Company, Rochester, N.Y., a corporation of
New Jersey
Continuation of application Ser. No. 470,499, July 8,
1965. This application Feb. 19, 1968, Ser. No. 706,703
U.S. Cl. 242—55.11                                    19 Claims
Int. Cl. G11b 15/32; G03b 1/56, 1/58

ABSTRACT OF THE DISCLOSURE

A roll of strip material is mounted in a housing with a surface of the roll exposed for application of a driving means in direct contact with the surface of the roll. A film stripper device adapted to engage the film roll and strip the film from the roll during rotation of the roll is disposed in such a manner with respect to the roll driving means as to form a guide channel for the leading end of the strip material from the roll.

---

This application is a continuation of application Ser. No. 470,499 filed July 8, 1965.

The present invention relates to a device for stripping and feeding strip material from a roll; and more particularly to such a device for stripping film and presenting the end thereof to a threading mechanism of a device, such as a motion picture projector.

In the art of automatic threading, considerable attention has been given to devices for threading a film through a motion picture projector wherein the leader portion of the film is placed in a self-threading guide mechanism or track. The present invention relates to the automatic placing of the leader portion of the film in the guide mechanism. Such a device is particularly useful in projectors which are designed to display selectively one of a plurality of motion picture films contained in a multiple rack. These projectors are sometimes referred to as "juke box" projectors.

Therefore, a primary object of the present invention is to provide an improved device for stripping strip material, such as film, from a roll and feeding it into a guide, such as a guide in an automatic-threading in motion picture projector.

In accordance with one embodiment of my invention, a roll of strip material is mounted in a housing on a rotatable core with a surface of the roll being exposed for surface driving. Within this exposed region is placed a film stripping means selectively biased against the outer surface of the roll to pick up the end thereof. It is initially guided by a surface of the stripping means away from the roll and to a guide, such as the guide track of a projector. A surface drive belt is positioned adjacent to the stripping device for rotating the roll to initiate stripping action and forms a mating leader film guide. Thus, the guiding surfaces of a stripping device and the drive belt cooperate to form a channel or passageway to direct the end of the strip away from the roll and into a strip utilization device, such as an automatic-threading movie projector. In another embodiment, the surface of a drive wheel cooperates with the surface of a stripping device to form a channel or passageway to guide the strip away from the roll and into the strip utilization device.

The subject matter which is regarded as my invention is particularly pointed out and distinctly claimed below. The invention, however, will best be understood by reference to the following description taken in connection with the accompanying drawing, in which:

Figure 1:
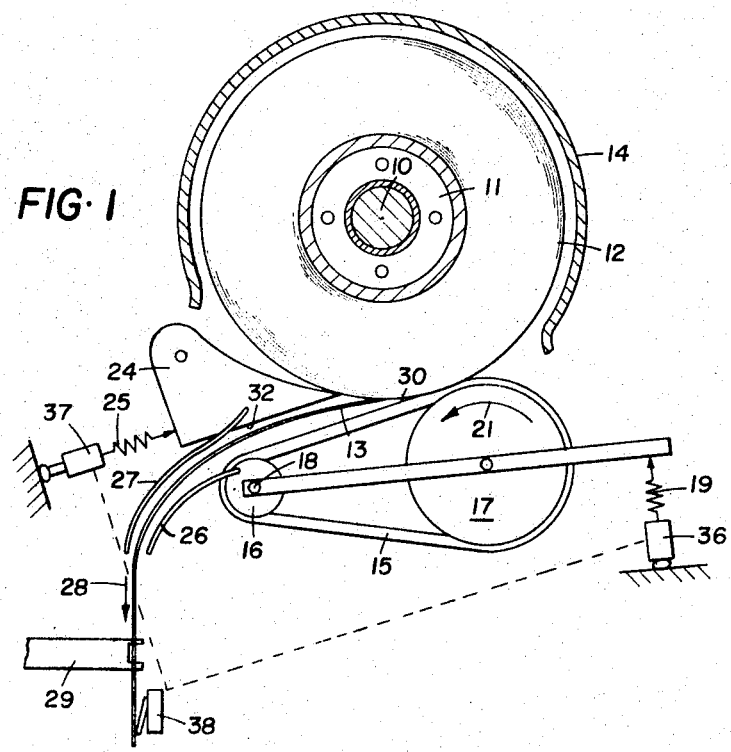
FIG. 1 is a diagrammatical side-elevational view, with certain parts in section, illustrating one embodiment of my invention.

In accordance with this invention, a central shaft 10 is shown in FIG. 1 supporting a reel 11 on which is wound a roll 12 of strip material, such as film 13. The roll 12 is protected by a housing 14 which may be of the type utilized to store one or several such rolls of film. The housing 14 is open at the lower side, as indicated, whereby the roll 12 may be engaged by a surface drive belt 15 driven by a pulley 16 over an idler pulley 17. One drive belt that works very well is a rubber hoop of the type often used in an O-ring seal. The belt 15 is pivotably supported on a pulley shaft 18.

Figure 2:
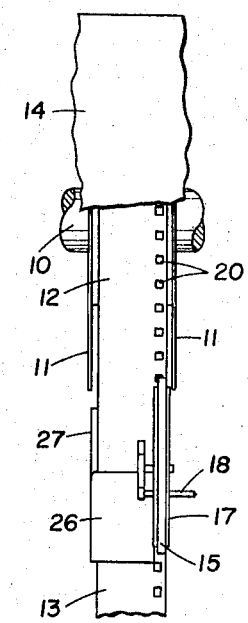
FIG. 2 is a fragmentary end view of the invention, taken from the left end of FIG. 1.

During the stripping operation, the idler pulley 17 is biased as by a spring means indicated at 19 to have the belt 15 engage the outer peripheral surface of the roll 12. By making belt 15 narrower than the width of roll 12, the belt need only engage perforations 20 so that the picture area of the film will not be damaged, as best seen in FIG. 2. As shown in FIG. 1, the idler rotates in a counterclockwise direction indicated by an arrow 21. During the stripping operation, a film stripper 24 is also biased against the outer peripheral surface of the roll 12 as by a spring 25. I prefer that the stripper 24 be formed of a slippery plastic material so that the film 13 may slide easily thereover.

As the film 13 is stripped from the roll 12, its leader end moves through a guide mechanism or track having upper and lower guide surfaces 26 and 27 respectively along the path of arrow 28, to a utilization device indicated in FIG. 1 as a pull-down claw 29 of a projector (not fully shown). It should be noted that a mating surface 30 of the belt 15 helps to guide the film 13 into the passageway between the guide surfaces 26 and 27. Similarly, a bottom outer surface 32 of the stripper 24 will co-operate to guide the film 13 between the guide surfaces 26 and 27. Thus, simply pressing the stripper 24 and the drive belt 15 against the outer surface of the roll 15 and rotating the pulley 16 will form a passageway 30–32 to guide the film 13 into the guide surfaces 26 and 27 and thus to the utilization device 29.

As indicated, the spring 19 is drivable to an engaging position by means such as a solenoid 36 with the solenoid 36 being energized by conventional means not illustrated, at the start of the stripping action and being de-energized once the film 13 is under the control of the claw 29. The spring 25 is positioned to press the stripper 24 against the surface of the roll 12 by a similar selectively operable positioning means 37. Several interlocking control means are known for generating signal information to de-energize the solenoids 36 and 37. One simple means is illustrated as a microswitch 38, sensitive to the passage of the film 13 beyond the claw 29.

Figure 3:
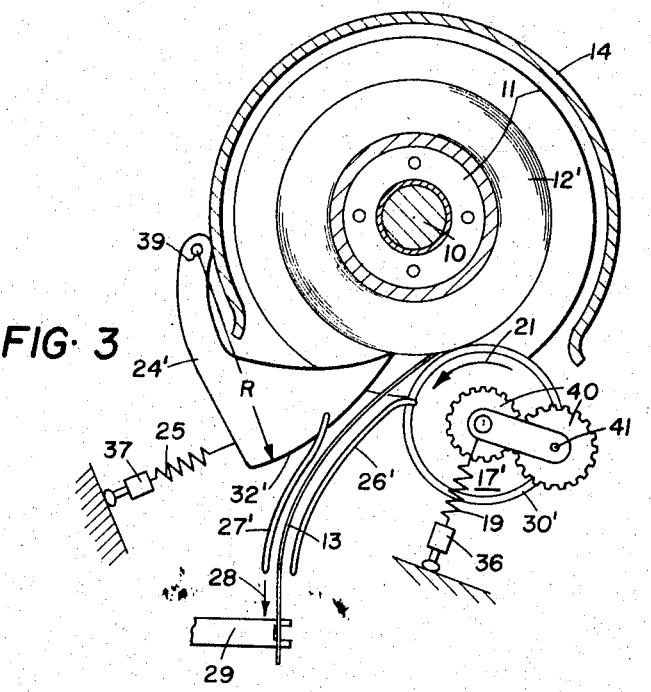
FIG. 3 is a diagrammatical side-elevational view, similar to FIG. 1, but illustrating another embodiment of the present invention.

In FIG. 3 I have shown a somewhat different embodiment of the present invention wherein a roll 12' is of a much smaller diameter and the stripping device 24' is provided with an outer curved surface 32' having a radius R which may be equal to the surface's distance from its pivot support point 39. A drive wheel 17' is used in this embodiment which has a diameter sufficient to form one side of a passageway or channel with curved surface 32' so that the film is guided between guide surface 26' (which is slightly longer than 26) and guide surface 27' in all positions of the wheel 17'. The wheel 17' is driven by gearing 40 and is pivotably supported on a shaft 41 of the more remote drive gear 20 so that surface driving of several size rolls such as 12 or 12' is feasible.

Although the roll 12' of FIG. 3 is illustrated as substantially smaller than the roll 12 of FIG. 1, the smaller roll 12' may be stripped by the embodiment of FIG. 1 and the large roll 12 may be stripped by the embodiment of FIG. 3 with equal faculty. As illustrated in FIG. 3, when stripping a smaller roll 12', both the stripper 24' and the inner drive surface 30' of the drive wheel 17' are moved closer to the support shaft 10 than the equivalent elements of FIG. 1. Also, the drive surface 30' of the drive wheel 17' may be formed of a rubber band or the like.

The invention has been described in detail with particular reference to preferred embodiments thereof, but it will be understood that variations and modifications can be effected within the spirit and scope of the invention as described hereinabove and as defined in the appended claims.

I claim:
1. A device for stripping and feeding thin flexible strip material from a roll of such material having a leading end, comprising:
   means centrally located with respect to the roll for rotatably supporting the roll;
   stripping means having a first surface engageable with the strip material on the roll during rotation thereof to separate the leading end of the strip material from the roll and having a second surface adapted to direct the leading end of the strip material away from the roll; and,
   drive means engageable with and adapted to rotate the roll so that the leading end of the roll is moved toward said stripping means, said drive means defining a surface adjacent said second surface of said stripping means and cooperating therewith to form a narrow passageway therebetween for guiding the leading end of the strip material away from the roll during rotation of the roll by said drive means.

2. A device, as set forth in claim 1, and further including:
   a housing substantially enclosing the roll of strip material, said housing having a side and means defining an opening in said side adapted to receive said stripping means and said drive means when in engagement with the roll.

3. A device, as set forth in claim 1, wherein said drive means includes:
   a drive pulley;
   an idler pulley spaced from said drive pulley;
   a belt extending around and supported by said pulleys, said belt having an elongated portion defining said cooperating surface.

4. A device as set forth in claim 3, further including:
   means biasing one of said pulleys toward the roll supporting means to urge said belt into driving engagement with the roll.

5. A device as set forth in claim 1, wherein said drive means includes:
   a drive wheel biased toward the roll supporting means to establish driving engagement with the roll.

6. A device, as set forth in claim 1, wherein:
   said drive means is narrower than the width of the roll so that only a portion of the width of the roll is engaged by said drive means.

7. A device, as set forth in claim 1, wherein:
   said stripping means is biased toward the roll supporting means to urge said first surface into engagement with the strip material.

8. In a motion picture projector, for projecting a rotatable roll of film having a leading end, the combination comprising:
   a stripper member adapted to engage the film and strip the leading end of film from the roll during rotation of the roll in a film unwinding direction, said stripper member defining an elongated surface for directing the leading end of the film away from the roll; and,
   a movable belt member positioned adjacent to said stripper member and adapted to engage and rotate the roll in a film unwinding direction, said belt member defining a surface spaced from the elongated surface of said stripper member to form a passageway therebetween for guiding the leading end of film from the roll.

9. A motion picture projector as in claim 8, wherein said belt member is rotatably supported on at least two spaced pulleys and said surface of said belt member is defined by a portion of said belt member between said pulleys on one side thereof.

10. A motion picture projector, for projecting a rotatable roll of film having a leading end, comprising:
    a stripper member adapted to engage the film and strip the leading end of film from the roll during rotation of the roll in a film unwinding direction, said stripper member having a surface for directing the leading end from the roll; and
    a rotatable roller member adapted to engage the roll adjacent to said stripper member to rotate the roll in a film unwinding direction, said roller member and said stripper member defining a narrow space therebetween for the passage of film therethrough as the film is stripped from the roll.

11. In a motion picture projector for projecting a roll of film having a leading end, the improvement comprising:
    means centrally located with respect to the roll for rotatably supporting the roll;
    stripping means movable into engagement with the roll and having a first surface engageable with film on the roll during rotation of the roll to separate the leading end of the film from the roll, said stripping means having a second surface adapted to direct the leading end of the film away from the roll when the roll is rotated in a film unwinding direction; and
    drive means movable into engagement with film on the roll and adapted to rotate the roll in a film unwinding direction so that the leading end thereof is moved toward said stripping means, said drive means defining an elongated guide portion positioned in closely spaced relationship with said second surface of said stripping means and adapted to cooperate therewith and with the roll to form a narrow substantially closed passageway for guiding the leading end of the film away from the roll during rotation of the roll by said guide means.

12. In a motion picture projector including a rotatable spindle for rotatably supporting a supply reel containing film, a pull-down member for engaging and advancing film through the projector, and means defining a film path from the supply reel to and past the pull-down member, the improvement comprising:

a stripper mechanism for stripping film from the supply reel and directing film along the film path to the pull-down member;

means for rendering said stripper mechanism effective to strip film from the supply reel and to effect movement of film along the film path to the pull-down member; and means for rendering said stripper mechanism ineffective to strip film from the supply reel, in response to movement of the film to the pull-down member.

13. In a motion picture projector including means for rotatably supporting a supply reel containing film having a leading end, means defining a film path, and a pull-down claw at a location in the film path for engaging and advancing film through the projector, the improvement comprising:

a movable drive belt having a first position for engaging and rotating the supply reel in a direction to unwind film therefrom, said drive belt being movable to a second position where it is ineffective to engage and rotate the supply reel;

a film stripping member having a first position for stripping the leading end of the film from said supply reel when the supply reel is rotated by said drive belt and a second position wherein it is ineffective to strip film from the reel, said stripping member and said drive belt cooperating in said first positions thereof to form a film passage for guiding the leading end of the film into and along the film path;

means for moving said drive belt and stripper finger from their second positions to their first positions to thereby strip the leading end of film from the supply roll and guide the leading end along the film path toward the location of the pull-down claw; and means responsive to the arrival of the leading end of the film at the location of the pull-down claw for effecting movement of said drive belt and said stripper finger from their first to their second positions.

14. In a web handling machine adapted to have a supply roll of web material rotatably supported thereon and having means defining a web path, and a web advancing mechanism adapted to engage the web at a location along the web path, the improvement comprising:

(a) means for rotating the roll in an unwinding direction;

(b) a stripping member for engaging the supply roll and stripping the leading end of the web material from the roll, said stripper member having a guide surface adapted to guide the leading end of the web away from said roll and along said web path when said stripping member engages the roll during unwinding rotation of the roll;

(c) means supporting said stripping member for movement into and out of engagement with the supply roll;

(d) means for moving said stripping member into engagement with the supply roll; and, (e) means responsive to the arrival of the web at said location along the web path for automatically moving said stripping member out of engagement with the roll upon the arrival of the web at said location.

15. In a motion picture projector adapted to have a film supply roll provided with a leading end rotatably supported thereon, and having a film path and a film advancing member effective to engage and advance film along the film path, the improvement comprising:

(a) a stripping member adapted to engage the supply roll to strip the leading end of the film therefrom and having a guide surface for guiding the leading end of film away from the roll and along the film path toward the advancing member;

(b) means supporting said stripping member for movement into and out of engagement with the supply roll;

(c) a drive member engageable with the supply roll to impart rotation thereto in a direction to unwind film therefrom and to drive the leading end of the film along the guide surface and film path in the direction of the advancing member;

(d) means supporting said drive member for movement into and out of engagement with the supply roll;

(e) means for moving said stripper member and said drive member into concurrent engagement with the supply roll to strip the leading end of film from the roll and thereby move the leading end toward the advancing member;

(f) means for automatically moving said stripping member and said drive member out of engagement with the roll when the advancing member becomes effective to advance the film along the film path.

16. In a motion picture projector for projecting a roll of film having a leading end and including a film path adapted to receive the leading end, the combination comprising:

means for rotatably supporting the roll of film on the projector;

a rotatable drive belt;

pulley means for rotatably supporting said drive belt to define a relatively straight elongated belt portion adapted to engage and rotate the roll in a film unwinding direction during rotation of the belt;

means for positioning said pulley means and said belt to selectively position said belt portion into and out of engagement with the film roll; and a stripping member adapted to engage the film roll and strip the leading end of the film from the roll during rotation of the roll by said belt portion, said stripping member having a guide surface positioned in close proximity to said belt portion when said stripping member and said belt engage the roll to define a substantially closed channel for guiding the leading end of the film from the roll into the film path.

17. In a motion picture projector for projecting a roll of film which has a leading end and which is adapted to be supported on a rotatable film reel positioned within a housing having an opening therein, the combination comprising:

a member movable into the opening and having an end portion adapted to engage the film roll during rotation thereof to direct the leading end of the film toward the opening; and drive means movable into the opening and adapted to engage and rotate the roll in a film unwinding direction to move the leading end of the film toward said member while said member is in engagement with the film roll;

said member and said drive means having surfaces, respectively, which cooperate to define a narrow passageway therebetween for guiding the leading end of the film through the opening and from the housing.

18. In a motion picture projector for projecting a roll of film which has a leading end and which is supported on a film reel positioned within a housing having an opening in one side thereof, the combination comprising:

an elongated member for rotatably supporting the reel within the housing for rotation relative to the housing;

a member movable into the opening and having an end portion adapted to engage the film roll during rotation of the roll on the elongated member to direct the leading end of the film toward the opening; and drive means movable into the opening and adapted to engage and rotate the roll on the elongated member in a film unwinding direction to move the leading end of the film toward said movable member while said movable member is in engagement with the film roll;

said movable member and said drive means having elongated surfaces, respectively, which cooperate to define a narrow passageway therebetween for guiding the leading end of the film through the opening and from the housing.

19. In a motion picture projector as claimed in claim 18 wherein said drive means includes a movable belt member having an elongated belt portion defining the elongated surface of said drive means.

References Cited

UNITED STATES PATENTS

| | | | |
|---|---|---|---|
| 2,051,790 | 8/1936 | Foster et al. | 242—55.11 |
| 2,730,990 | 1/1959 | Gray et al. | 118—235 |
| 2,891,736 | 6/1964 | Blaes | 242—55.12 |
| 3,150,840 | 9/1966 | Briskin et al. | 242—55.13 |
| 3,254,856 | 6/1966 | Camras | 242—55.13 |

LEONARD D. CHRISTIAN, *Primary Examiner.*

U.S. Cl. X.R.

242—55.13; 226—91; 352—158